(12) United States Patent
Chappell, Jr. et al.

(10) Patent No.: US 10,071,844 B2
(45) Date of Patent: Sep. 11, 2018

(54) MULTI-COMPARTMENT PRODUCTS CONTAINING WET AND DRY FOOD COMPONENTS

(71) Applicant: NESTEC S.A., Vevey (CH)

(72) Inventors: Russell Leon Chappell, Jr., Spring Lake, MI (US); Anthony Edward Dzikowicz, Jr., Grand Haven, MI (US); Jason Everett Mann, Fremont, MI (US); Dharmendra Kumar Mishra, Fremont, MI (US); Scott David Peterson, Spring Lake, MI (US); Michael John Sarachman, Grand Rapids, MI (US)

(73) Assignee: Nestec S.A., Vevey (CH)

( * ) Notice: Subject to any disclaimer, the term of this patent is extended or adjusted under 35 U.S.C. 154(b) by 403 days.

(21) Appl. No.: 13/733,564

(22) Filed: Jan. 3, 2013

(65) Prior Publication Data
US 2013/0122138 A1  May 16, 2013

Related U.S. Application Data

(60) Provisional application No. 61/619,959, filed on Apr. 4, 2012, provisional application No. 61/619,961, filed on Apr. 4, 2012.

(51) Int. Cl.
*B65D 81/32* (2006.01)
*B65B 9/00* (2006.01)
(Continued)

(52) U.S. Cl.
CPC .......... *B65D 81/3294* (2013.01); *A23L 33/40* (2016.08); *A23L 35/00* (2016.08);
(Continued)

(58) Field of Classification Search
CPC ......... B65D 81/3294; B65B 1/00; B65B 3/00; B65B 25/001
(Continued)

(56) References Cited

U.S. PATENT DOCUMENTS

| 4,346,650 A | 8/1982 | Zaitsu |
| 5,277,920 A * | 1/1994 | Weaver, Jr. ................... 426/115 |

(Continued)

FOREIGN PATENT DOCUMENTS

| WO | 8801248 | 2/1988 |
| WO | 201107888 | 6/2011 |
| WO | 2012145346 | 10/2012 |

OTHER PUBLICATIONS

Amazon.com. "Giddy Dip'ems". Oct. 21, 2013 [evidentiary reference]. http://www.amazon.com/giddy-dipems-variety-4-4ct-snacks/dp/B003CNLNXA.*
(Continued)

*Primary Examiner* — D. Lawrence Tarazano
*Assistant Examiner* — Stephanie A Cox
(74) *Attorney, Agent, or Firm* — Gary M. Lobel, Esq.

(57) ABSTRACT

The present disclosure provides multi-component food products having a wet food component and a dry food component. The multi-component food product is shelf-stable and does not include any artificial preservatives. Methods for providing a shelf-stable multi-component food product having a wet food component and a dry food component without artificial preservatives to a consumer are also provided, as are methods for marketing such a shelf-stable multi-component food product.

17 Claims, 2 Drawing Sheets

(51) Int. Cl.
- *B65B 1/00* (2006.01)
- *B65B 3/00* (2006.01)
- *B65B 25/00* (2006.01)
- *G06Q 99/00* (2006.01)
- *B65B 55/12* (2006.01)
- *B65B 55/24* (2006.01)
- *B65D 1/36* (2006.01)
- *A23L 33/00* (2016.01)
- *A23L 35/00* (2016.01)

(52) U.S. Cl.
CPC ............... *B65B 1/00* (2013.01); *B65B 3/00* (2013.01); *B65B 9/00* (2013.01); *B65B 25/001* (2013.01); *B65B 55/12* (2013.01); *B65B 55/24* (2013.01); *B65D 1/36* (2013.01); *G06Q 99/00* (2013.01); *B65B 2230/02* (2013.01); *B65D 2203/00* (2013.01)

(58) Field of Classification Search
USPC ........................................................ 426/115
See application file for complete search history.

(56) References Cited

U.S. PATENT DOCUMENTS

| | | | | |
|---|---|---|---|---|
| 5,727,679 | A * | 3/1998 | Newarski | 206/222 |
| 5,747,084 | A * | 5/1998 | Cochran et al. | 426/120 |
| D429,147 | S * | 8/2000 | Baker et al. | D9/717 |
| 6,152,302 | A | 11/2000 | Miller | |
| 6,840,395 | B2 * | 1/2005 | Agarwal et al. | 220/556 |
| D529,820 | S * | 10/2006 | Kissner et al. | D9/737 |
| 2006/0134307 | A1 | 6/2006 | Sekula | |
| 2011/0009348 | A1 | 1/2011 | Jeukendrup | |
| 2011/0236505 | A1 | 9/2011 | Jeukendrup | |
| 2012/0034347 | A1 | 2/2012 | Feuvrier-Roy | |

OTHER PUBLICATIONS

Fooducate.com. "Giddy Dip'ems". Oct. 21, 2013 [evidentiary reference]. http://www.fooducate.com/app#page=product&id=4E194096-D018-11E1-956E-1231381BA074.*

Dar. "Strawbery Puree". Oct. 21, 2013 [evidentiary reference]. http://www.dar.lviv.ua/en/production/puree/strawberry-puree.*

Giddy snacks—http://web.archive.org/web20100323043042/http://www.giddysnacks.com/products.php (archived Mar. 23, 2010 giddy snacks—http://web.archive.org/web/20100323043020/http://www.giddysnacks.com/nutrition.php (archived Mar. 23, 2010) giddy snacks—http://web.archive.org/web/20100324152250/http://www.giddysnacks.com (archived Mar. 24, 2010).

Meiji Abracadabra Yan Yan Kids—Biscuits Stick'n Mango Cream, Record ID 1642111, Date Published Oct. 2011—1 page.

Kraft Handi-Snacks—Honey Maid Grahams 'n Apple Dip, Record ID 764718, Date Published Sep. 2007—3 pages.

Terena Thyne Eisner, "Hawaiian Airlines Goes Green," Wandermelon, XP002695830 Retrieved from the Internet: URL: http://wandermelon.com/2009/04/28/hawaiian-airlines-goes-green/, Apr. 28, 2009.

International Search Report and Written Opinion dated May 24, 2013 received in PCT Application No. PCT/IB2013/050069.

International Search Report and Written Opinion dated May 24, 2013 received in PCT Application No. PCT/IB2013/050070.

* cited by examiner

MULTI-COMPARTMENT PRODUCTS CONTAINING WET AND DRY FOOD COMPONENTS

CROSS-REFERENCE TO RELATED APPLICATIONS

This application claims priority to U.S. Provisional Patent Appl. Nos. 61/619,959, filed Apr. 4, 2012, and 61/619,961, filed Apr. 4, 2012, the entire contents of which are expressly incorporated herein by reference thereto.

BACKGROUND

The present disclosure relates generally to health and nutrition. More specifically, the present disclosure relates to multi-compartment products that are shelf-stable and include a wet food component, a dry food component and no artificial preservatives.

Methods of preserving foods including, for example, refrigeration and freezing, are well known. These methods, however, may not always provide optimal results for product development or marketing of a specific product. For example, while it is possible to refrigerate or freeze food products to extend the shelf-life of the product, a product may be designed to be marketed to a consumer on a retail store shelf that is not located in a refrigerated or frozen foods section of a store. To achieve shelf-stability in such instances, many food products currently on the market utilize some form of an artificial product preservative. Preservatives are chemicals that can keep packaged or processed foods in edible condition for long periods of time. Such additives, although approved by the United States Food and Drug Administration for human consumption, can still pose health risks to consumers and can change the organoleptic properties of food products.

In contrast to the use of chemical preservatives, some commercial products are manufactured using multiple manufacturing systems where the individual components of multi-component products are separately packaged and then combined as a kit or assembly in a secondary operation. Due to the number of separate manufacturing steps and physical locations required to complete such steps, manufacturing of such products can be costly and not economical for large scale manufacturing.

Accordingly, a need exists for a shelf-stable, multi-component product that includes a wet food component, a dry food component and no artificial preservatives. Additionally, a need exists for a manufacturing process for producing a single, dual compartment package containing both a wet food component and a dry food component without the use of artificial preservatives.

SUMMARY

In the present disclosure, multi-compartment products containing wet and dry food components are provided. In an embodiment, a multi-component food product is provided and includes a wet food component, and a dry food component, wherein the multi-component food product is shelf-stable and does not contain any artificial preservatives.

In an embodiment, neither the wet food component nor the dry food component includes any preservatives. The food product may be an all natural food product.

In an embodiment, the food product does not contain any anti-bacterial preservatives, or any added ingredients intended to function as a preservative.

In an embodiment, the food product contains only natural preservatives. The natural preservatives may be selected from the group consisting of sodium, tocopherols, fermentation byproducts, niacin, organic acids, or combinations thereof.

In an embodiment, a serving size of the wet food component ranges from about 0.5 to about 1.5 ounces, or from about 0.75 to about 1.25 ounces. The serving size of the wet food component may be designed to reduce the risk of childhood obesity.

In an embodiment, the wet food component has a pH that is less than about 4.6, or ranges from about 3.0 to about 4.6.

In an embodiment, the wet food component has a water activity ranging from greater than or equal to about 0.70 to less than 1.0, or that is greater than about 0.80.

In an embodiment, the wet food component is a food product that may be hot-filled or cold-filled. For example, the wet food component may be a food product selected from the group consisting of a fruit sauce, oatmeal, fruit pieces, a yogurt product, a dairy product, cheese, a savory product, a vegetable sauce, an ethnic sauce, or combinations thereof. The vegetable sauce may be selected from the group consisting of a tomato sauce, hummus, a bean sauce, guacamole, or combinations thereof The ethnic sauce may be selected from the group consisting of a curry sauce, salsa, or combinations thereof.

In an embodiment wherein the, wet food component is a yogurt product, the yogurt product may be selected from the group consisting of a yogurt powder, a fresh yogurt, a shelf-stable yogurt, a freeze-dried yogurt, a yogurt-like substance, and combinations thereof.

In an embodiment, the wet food component includes at least about 50% by weight of a fruit product selected from the group consisting of a fruit puree, a fruit juice, a fruit piece, a fruit concentrate, whole fruit, or combinations thereof. In other embodiments, the wet food component includes at least about 60%, or at least about 70%, or at least about 80%, or at least about 90%, or about 100% by weight of a fruit product. The wet food component may also provide a daily serving of fruits and/or vegetables.

In an embodiment, the wet food component has an age appropriate viscosity. The wet food component may have a viscosity ranging from about 5,000 to about 100,000 cps, or from about 10,000 to about 80,000 cps, or from about 20,000 to about 70,000 cps.

In an embodiment, the product includes a sodium content that is less than about 100 mg per serving size of the product including a combination of the wet food component and the dry food component. The serving size of the product including the combination of the wet food component and the dry food component may be about 50 g.

In an embodiment, the product includes a sugar content that is less than about 12 g per serving size of the product including a combination of the wet food component and the dry food component. The serving size of the product including the combination of the wet food component and the dry food component may be about 50 g.

In an embodiment, the wet food component includes a sugar content that is less than about 5 g per 50 g serving size of the product including a combination of the wet food component and the dry food component.

In an embodiment, the dry food component includes a sugar content that is less than about 7 g per 50 g serving size of the product including a combination of the wet food component and the dry food component.

In an embodiment, the product includes a fat content that is less than about 5 g per serving size of the product including a combination of the wet food component and the dry food component. The serving size of the product including the combination of the wet food component and the dry food component may be about 50 g.

In an embodiment, a serving size of the dry food component ranges from about 0.25 to about 1.75 ounces, or from about 0.5 to about 1.5 ounces. The serving size of the dry food component may be designed to reduce the risk of childhood obesity.

In an embodiment, the dry food component has a water activity ranging from about 0.05 to about 0.70, or up to and including 0.65.

In an embodiment, the dry food component includes antioxidants. The antioxidants may include mixed tocopherols.

In an embodiment, the dry food component includes an ingredient having whole grains, liquid whole grains, multigrains, etc. The dry food component may include whole grains in an amount from about 1 to about 5 g per dry food component.

In an embodiment, the dry food component is a food product selected from the group consisting of a cookie, a cracker, an extruded and dried product, an extruded and baked product, a waffle, a rusk, a wafer, a chip, a coated product, an uncoated product, a granola bar, a biscuit, a freeze-dried product, puffs, or combinations thereof.

In an embodiment, the dry food component has a hardness value between about 400 and about 600 N peak force. The hardness value may be sufficient to allow the dry food component to be dipped at least once into wet food component and maintain structural stability. The hardness value may also be sufficient to allow the dry food component to dissolve in a consumer's mouth when consumed.

In an embodiment, the dry food component has an age appropriate shape, or may be shaped to help a child learn to self-feed.

In an embodiment, the dry food component is appropriately sized for small hands. The dry food component may include a length from about 2.0 to about 3.0 inches, a width from about 0.5 to about 1.5 inches, and a thickness from about 0.1 to about 1.0 inch.

In an embodiment, the dry food component has a surface characteristic. The surface characteristic may be selected from the group consisting of a raised design, and indented design, or combinations thereof. The raised or indented designs may be selected from the group consisting of letters, numbers, geometric shapes, or combinations thereof. The surface characteristic can help the wet food component cling to the dry food component, and can help a child to grip the dry food component. In an embodiment, the surface characteristic may be a bump or a plurality of bumps on a bottom side of dry food component to aid in stackability of the dry food component.

In an embodiment, the dry food component is sized to fit into a dipping compartment of a tray.

In an embodiment, a shape of the dry food component provides a visual cue of use with respect to a tray compartment.

In an embodiment, the wet and dry food components include all natural ingredients.

In an embodiment, the product is designed for children ages 6 and below. The product may also be designed, for example, for children ages 18 months to 36 months.

In another embodiment, a packaged food product is provided and includes a tray having at least first and second compartments, a wet food component housed by the first compartment, and a dry food component housed by the second compartment, wherein the packaged food product is shelf-stable and does not contain any artificial preservatives.

In an embodiment, the tray is shaped to promote age appropriate feeding, and may be sized to be gripped by small hands.

In an embodiment, a top surface of the tray has a surface characteristic selected from the group consisting of a thumb groove, a raised surface pattern, and indented surface pattern, or combinations thereof. In an embodiment, the surface characteristic is a thumb groove, and at least two thumb grooves are provided on opposing sides of the top surface of the tray.

In an embodiment, the tray has a shape selected from the group consisting of round, square, rectangular, triangular, oval, hemi-spherical, or combinations thereof. The tray may also have rounded corners.

In an embodiment, the at least first and second compartments are shaped for easy self-feeding. The at least first and second compartments may have the same shape, or different shapes. At least one of the at least first and second compartments has a shape selected from the group consisting of round, square, rectangular, triangular, oval, hemi-spherical, or combinations thereof. In an embodiment, the first compartment has a shape that is similar to a shape of the dry food component.

In an embodiment, the tray includes a material having one of oxygen scavengers, an oxygen barrier and a moisture barrier.

In an embodiment, the tray includes a lid or a cover. The lid or cover may be a plastic film adhered to a portion of the tray to seal the first and second compartments. In an embodiment, the first and second compartments are sealed with the plastic film separately. The plastic film may have a material having one of oxygen scavengers, an oxygen barrier and a moisture barrier.

In yet another embodiment, a method for marketing a multi-component food product is provided. The method includes providing a tray having first and second compartments, a wet food component housed in the first compartment and a dry food component housed in the second compartment, wherein the multi-component food product is shelf-stable and does not contain any artificial preservatives. The method further includes placing the multi-component food product on a retail shelf.

In an embodiment, the retail shelf is located in a location having a temperature that is warmer than a typical refrigerator temperature.

In an embodiment, the retail shelf is located in a location having a temperature that is one of a typical refrigerator temperature and a typical freezer temperature.

In an embodiment, the multi-component food product further includes an indicia selected from the group consisting of branding information, nutritional information, shapes, colors, or images corresponding to at least one of the wet food component and the dry food component.

In still yet another embodiment, a method for providing a multi-component food product to an individual is provided. The method includes providing multi-component food product having a tray having first and second compartments, a wet food component housed in the first compartment and a dry food component housed in the second compartment, wherein the multi-component food product is shelf-stable and does not contain any artificial preservatives. The method further includes and instructing the individual to consume the multi-component food product.

An advantage of the present disclosure is to provide improved food products.

Another advantage of the present disclosure is to provide shelf-stable food products having a wet food component and a dry food component.

Yet another advantage of the present disclosure is to provide shelf-stable food products having a wet food component and a dry food component and no artificial preservatives.

Still yet another advantage of the present disclosure is to provide improved food products that aid in self-feeding.

Another advantage of the present disclosure is to provide improved food products designed for consumption by small children.

Yet another advantage of the present disclosure is to provide methods for making shelf-stable food products having a wet food component, a dry food component and no artificial preservatives.

Still yet another advantage of the present disclosure is to provide methods for marketing shelf-stable food products having a wet food component, a dry food component and no artificial preservatives.

Yet another advantage of the present disclosure is to provide methods for packaging shelf-stable food products having a wet food component, a dry food component and no artificial preservatives.

Another advantage of the present disclosure is to provide methods for teaching a child to self-feed.

Still yet another advantage of the present disclosure is to provide methods of administering a healthy food product to an individual.

Additional features and advantages are described herein, and will be apparent from the following Detailed Description and the figures.

DETAILED DESCRIPTION

Figure 1:
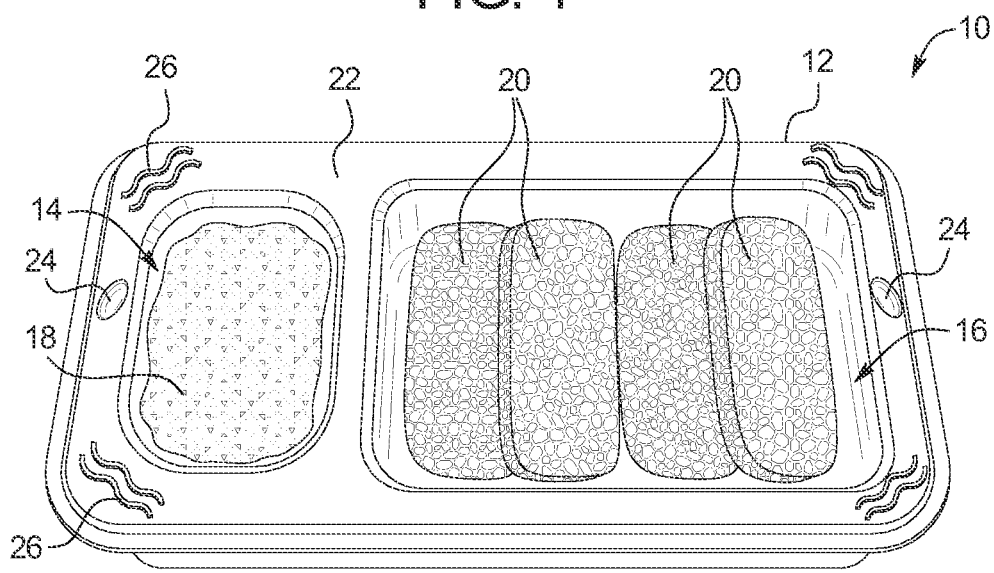
FIG. 1 illustrates a perspective view of a food product in accordance with an embodiment of the present disclosure.

As used in this disclosure and the appended claims, the singular forms "a," "an" and "the" include plural referents unless the context clearly dictates otherwise.

As used herein, "about" is understood to refer to numbers in a range of numerals. Moreover, all numerical ranges herein should be understood to include all integer, whole or fractions, within the range.

As used herein, the term "antioxidant" is understood to include any one or more of various substances such as beta-carotene (a vitamin A precursor), vitamin C, vitamin E, and selenium that inhibit oxidation or reactions promoted by Reactive Oxygen Species ("ROS") and other radical and non-radical species. Additionally, antioxidants are molecules capable of slowing or preventing the oxidation of other molecules. Non-limiting examples of antioxidants include carotenoids, coenzyme Q10 ("CoQ10"), flavonoids, glutathione, Goji (wolfberry), hesperidin, lactowolfberry, lignan, lutein, lycopene, polyphenols, selenium, tocopherols, vitamin A, vitamin $B_1$, vitamin $B_6$, vitamin $B_{12}$, vitamin C, vitamin D, vitamin E, zeaxanthin, or combinations thereof.

As used herein, "cheese" shall include a natural, processed, or artificial cheese, and natural, processed, or artificial cheese or cheese-like product.

As used herein, "carbohydrate(s)" are meant to include Monosaccharides include Trioses (such as: Ketotriose (Dihydroxyacetone); Aldotriose (Glyceraldehyde)); Tetroses which include: Ketotetrose (such as: Erythrulose) and Aldotetroses (such as:Erythrose, Threose); Pentoses which include: Ketopentose (such as: Ribulose, Xylulose) Aldopentose (such as: Ribose, Arabinose, Xylose, Lyxose), Deoxy sugar (such as: Deoxyribose); Hexoses which include: Ketohexose (such as: Psicose, Fructose, Sorbose, Tagatose), Aldohexose (such as: Allose, Altrose, Glucose, Mannose, Gulose, Idose, Galactose, Talose), Deoxy sugar (such as: Fucose, Fuculose, Rhamnose); Heptose (such as: Sedoheptulose); Octose; Nonose (such as: Neuraminic acid); Disaccharides which include: Sucrose; Lactose; Maltose; Trehalose; Turanose; Cellobiose; kojiboise; nigerose; isomaltose; and palatinose; Trisaccharides which include: Melezitose; and Maltotriose; Oligosaccharides that include: corn syrups and maltodextrin; and Polysaccharides that include: glucan (such as dextrin, dextran, beta-glucan), glycogen, mannan, galactan, and starch (such as those from corn, wheat, tapioca, rice, and potato, including Amylose and Amylopectin. The starches can be natural or modified or gelatinized); or combinations thereof Carbohydrates also include source of sweeteners such as honey, maple syrup, glucose (dextrose), corn syrup, corn syrup solids, high fructose corn syrups, crystalline fructose, juice concentrates, and crystalline juice.

The term "dietary recommended intake" is preferably meant to include the nutrition recommendations introduced in 1997 by the Institute of Medicine; used in the US and Canada.

While the terms "individual" and "patient" are often used herein to refer to a human, the invention is not so limited. Accordingly, the terms "individual" and "patient" refer to any animal, mammal or human having or at risk for a medical condition that can benefit from the treatment.

As used herein, the term "minerals" is understood to include boron, calcium, chromium, copper, iodine, iron, magnesium, manganese, molybdenum, nickel, phosphorus, potassium, selenium, silicon, tin, vanadium, zinc, or combinations thereof.

"Nutritional products," or "nutritional compositions," as used herein, are understood to include any number of optional additional ingredients, including conventional food additives (synthetic or natural), for example one or more acidulants, additional thickeners, buffers or agents for pH adjustment, chelating agents, colorants, emulsifies, excipient, flavor agent, mineral, osmotic agents, a pharmaceutically acceptable carrier, preservatives, stabilizers, sugar, sweeteners, texturizers, and/or vitamins. The optional ingredients can be added in any suitable amount. The nutritional products or compositions may be a source of complete nutrition or may be a source of incomplete nutrition.

As used herein, "phytochemicals" or "phytonutrients" are non-nutritive compounds that are found in many foods. Phytochemicals are functional foods that have health benefits beyond basic nutrition, and are health promoting compounds that come from plant sources. "Phytochemicals" and "Phytonutrients" refers to any chemical produced by a plant that imparts one or more health benefit on the user. Non-limiting examples of phytochemicals and phytonutrients include those that are:

i) phenolic compounds which include monophenols (such as, for example, apiole, carnosol, carvacrol, dillapiole, rosemarinol); flavonoids (polyphenols) including flavonols (such as, for example, quercetin, fingerol, kaempferol, myricetin, rutin, isorhamnetin), flavanones (such as, for example, fesperidin, naringenin, silybin, eriodictyol), flavones (such as, for example, apigenin, tangeritin, luteolin), flavan-3-ols (such as, for example, catechins, (+)-catechin, (+)-gallocatechin, (−)-epicatechin, (−)-epigallocatechin, (−)-epigallocatechin gallate (EGCG), (−)-epicatechin 3-gallate, theaflavin, theaflavin-3-gallate, theaflavin-3'-gallate, theaflavin-3,3'-digallate, thearubigins), anthocyanins (flavonals) and anthocyanidins (such as, for example, pelargonidin, peonidin, cyanidin, delphinidin, malvidin, petunidin), isoflavones (phytoestrogens) (such as, for example, daidzein (formononetin), genistein (biochanin A), glycitein), dihydroflavonols, chalcones, coumestans (phytoestrogens), and Coumestrol; Phenolic acids (such as: Ellagic acid, Gallic acid, Tannic acid, Vanillin, curcumin); hydroxycinnamic acids (such as, for example, caffeic acid, chlorogenic acid, cinnamic acid, ferulic acid, coumarin); lignans (phytoestrogens), silymarin, secoisolariciresinol, pinoresinol and lariciresinol); tyrosol esters (such as, for example, tyrosol, hydroxytyrosol, oleocanthal, oleuropein); stilbenoids (such as, for example, resveratrol, pterostilbene, piceatannol) and punicalagins;

ii) terpenes (isoprenoids) which include carotenoids (tetraterpenoids) including carotenes (such as, for example, alpha-carotene, beta-carotene, gamma-carotene, δ-carotene, lycopene, neurosporene, phytofluene, phytoene), and xanthophylls (such as, for example, canthaxanthin, cryptoxanthin, aeaxanthin, astaxanthin, lutein, rubixanthin); monoterpenes (such as, for example, limonene, perillyl alcohol); saponins; lipids including: phytosterols (such as, for example, campesterol, beta sitosterol, gamma sitosterol, stigmasterol), tocopherols (vitamin E), and ω-3, -6, and -9 fatty acids (such as, for example, gamma-linolenic acid); triterpenoid (such as, for example, oleanolic acid, ursolic acid, betulinic acid, moronic acid);

iii) betalains which include Betacyanins (such as: betanin, isobetanin, probetanin, neobetanin); and betaxanthins (non glycosidic versions) (such as, for example, indicaxanthin, and vulgaxanthin);

iv) organosulfides, which include, for example, dithiolthiones (isothiocyanates) (such as, for example, sulphoraphane); and thiosulphonates (allium compounds) (such as, for example, allyl methyl trisulfide, and diallyl sulfide), indoles, glucosinolates, which include, for example, indole-3-carbinol; sulforaphane; 3,3'-diindolylmethane; sinigrin; allicin; alliin; allyl isothiocyanate; piperine; syn-propanethial-S-oxide;

v) protein inhibitors, which include, for example, protease inhibitors;

vi) other organic acids which include oxalic acid, phytic acid (inositol hexaphosphate); tartaric acid; and anacardic acid; or vii) combinations thereof.

As used herein, a "prebiotic" is a food substance that selectively promotes the growth of beneficial bacteria or inhibits the growth or mucosal adhesion of pathogenic bacteria in the intestines. They are not inactivated in the stomach and/or upper intestine or absorbed in the gastrointestinal tract of the person ingesting them, but they are fermented by the gastrointestinal microflora and/or by probiotics. Prebiotics are, for example, defined by Glenn R. Gibson and Marcel B. Roberfroid, "Dietary Modulation of the Human Colonic Microbiota: Introducing the Concept of Prebiotics," J. Nutr. 1995 125: 1401-1412 . Non-limiting examples of prebiotics include acacia gum, alpha glucan, arabinogalactans, beta glucan, dextrans, fructooligosaccharides, fucosyllactose, galactooligosaccharides, galactomannans, gentiooligosaccharides, glucooligosaccharides, guar gum, inulin, isomaltooligosaccharides, lactoneotetraose, lactosucrose, lactulose, levan, maltodextrins, milk oligosaccharides, partially hydrolyzed guar gum, pecticoligosaccharides, resistant starches, retrograded starch, sialooligosaccharides, sialyllactose, soyoligosaccharides, sugar alcohols, xylooligosaccharides, or their hydrolysates, or combinations thereof.

As used herein, probiotic micro-organisms (hereinafter "probiotics") are food-grade microorganisms (alive, including semi-viable or weakened, and/or non-replicating), metabolites, microbial cell preparations or components of microbial cells that could confer health benefits on the host when administered in adequate amounts, more specifically, that beneficially affect a host by improving its intestinal microbial balance, leading to effects on the health or well-being of the host. See, Salminen S, Ouwehand A. Benno Y. et al., "Probiotics: how should they be defined?," Trends Food Sci. Technol., 1999:10, 107-10. In general, it is believed that these micro-organisms inhibit or influence the growth and/or metabolism of pathogenic bacteria in the intestinal tract. The probiotics may also activate the immune function of the host. For this reason, there have been many different approaches to include probiotics into food products. Non-limiting examples of probiotics include *Aerococcus, Aspergillus, Bacillus, Bacteroides, Bifidobacterium, Candida, Clostridium, Debaromyces, Enterococcus, Fusobacterium, Lactobacillus, Lactococcus, Leuconostoc, Melissococcus, Micrococcus, Mucor, Oenococcus, Pediococcus, Penicillium, Peptostrepococcus, Pichia, Propionibacterium, Pseudocatenulatum, Rhizopus, Saccharomyces, Staphylococcus, Streptococcus, Torulopsis, Weissella*, or combinations thereof.

The terms "protein," "peptide," "oligopeptides" or "polypeptide," as used herein, are understood to refer to any composition that includes, a single amino acids (monomers), two or more amino acids joined together by a peptide bond (dipeptide, tripeptide, or polypeptide), collagen, precursor, homolog, analog, mimetic, salt, prodrug, metabolite, or fragment thereof or combinations thereof. For the sake of clarity, the use of any of the above terms is interchangeable unless otherwise specified. It will be appreciated that polypeptides (or peptides or proteins or oligopeptides) often contain amino acids other than the 20 amino acids commonly referred to as the 20 naturally occurring amino acids, and that many amino acids, including the terminal amino acids, may be modified in a given polypeptide, either by natural processes such as glycosylation and other post-translational modifications, or by chemical modification techniques which are well known in the art. Among the known modifications which may be present in polypeptides of the present invention include, but are not limited to, acetylation, acylation, ADP-ribosylation, amidation, covalent attachment of a flavanoid or a heme moiety, covalent attachment of a polynucleotide or polynucleotide derivative, covalent attachment of a lipid or lipid derivative, covalent attachment of phosphatidylinositol, cross-linking, cyclization, disulfide bond formation, demethylation, formation of covalent cross-links, formation of cystine, formation of pyroglutamate, formylation, gamma-carboxylation, glycation, glycosylation, glycosylphosphatidyl inositol ("GPI") membrane anchor formation, hydroxylation, iodination, methylation, myristoylation, oxidation, proteolytic processing, phosphorylation, prenylation, racemization, selenoylation, sulfation, transfer-RNA mediated addition of amino acids to polypeptides such as arginylation, and ubiquitination. The term "protein" also includes "artificial proteins" which refers to linear or non-linear polypeptides, consisting of alternating repeats of a peptide.

Non-limiting examples of proteins include dairy based proteins, plant based proteins, animal based proteins and artificial proteins. Dairy based proteins include, for example, casein, caseinates (e.g., all forms including sodium, calcium, potassium caseinates), casein hydrolysates, whey (e.g., all forms including concentrate, isolate, demineralized), whey hydrolysates, milk protein concentrate, and milk protein isolate. Plant based proteins include, for example, soy protein (e.g., all foil is including concentrate and isolate), pea protein (e.g., all forms including concentrate and isolate), canola protein (e.g., all forms including concentrate and isolate), other plant proteins that commercially are wheat and fractionated wheat proteins, corn and it fractions including zein, rice, oat, potato, peanut, green pea powder, green bean powder, and any proteins derived from beans, lentils, and pulses. Animal based proteins may be selected from the group consisting of beef, poultry, fish, lamb, seafood, or combinations thereof.

As used herein, "shelf-stable" or "shelf-stability" refers to a product's ability to be safely stored in a sealed container at room or ambient temperature for a usefully long shelf life.

As used herein, a "synbiotic" is a supplement that contains both a prebiotic and a probiotic that work together to improve the microflora of the intestine.

As used herein the term "vitamin" is understood to include any of various fat-soluble or water-soluble organic substances (non-limiting examples include vitamin A, Vitamin B1 (thiamine), Vitamin B2 (riboflavin), Vitamin B3 (niacin or niacinamide), Vitamin B5 (pantothenic acid), Vitamin B6 (pyridoxine, pyridoxal, or pyridoxamine, or pyridoxine hydrochloride), Vitamin B7 (biotin), Vitamin B9 (folic acid), and Vitamin B12 (various cobalamins; commonly cyanocobalamin in vitamin supplements), vitamin C, vitamin D, vitamin E, vitamin K, folic acid and biotin) essential in minute amounts for normal growth and activity of the body and obtained naturally from plant and animal foods or synthetically made, pro-vitamins, derivatives, analogs.

In an embodiment, a source of vitamins or minerals can include at least two sources or forms of a particular nutrient. This represents a mixture of vitamin and mineral sources as found in a mixed diet. Also, a mixture may also be protective in case an individual has difficulty absorbing a specific form, a mixture may increase uptake through use of different transporters (e.g., zinc, selenium), or may offer a specific health benefit. As an example, there are several forms of vitamin E, with the most commonly consumed and researched being tocopherols (alpha, beta, gamma, delta) and, less commonly, tocotrienols (alpha, beta, gamma, delta), which all vary in biological activity. There is a structural difference such that the tocotrienols can more freely move around the cell membrane; several studies report various health benefits related to cholesterol levels, immune health, and reduced risk of cancer development. A mixture of tocopherols and tocotrienols would cover the range of biological activity.

Most commercial products currently on the market utilize some form of artificial preservative to achieve shelf-stability. Alternatively, some commercial products utilize multiple manufacturing systems to achieve shelf-stability where products are separately packaged and then combined as a kit or assembly in a secondary operation. For both health and convenience reasons, neither of these product manufacturing methods are optimal in attempting to achieve shelf-stability. Accordingly, Applicant has developed a method of producing a single, dual compartment package containing both a wet and dry product that is shelf-stable and does not include artificial preservatives. As such, Applicant is able to provide a nutritionally and developmentally appropriate artificial preservative-free healthy nutritional composition. In an embodiment, the nutritional composition is a snack that is designed for dipping.

As illustrated in FIG. 1, the present disclosure provides products 10 including at least two food components (e.g., a wet food component and a dry food component, two wet food components, two dry food components, etc.). In an embodiment, products 10 include a tray 12 having at least first and second compartments 14, 16. In an embodiment, first compartment 14 includes a first food component 18 that is a wet food component, and second compartment 16 includes a second food component 20 that is a dry food component. Either or both of wet and dry food components 18, 20 may be free from artificial preservatives and product 10 is shelf-stable.

Tray 12 of the present disclosure may be used for many purposes including, but not limited to, shipping, storing, and displaying retail products. Tray 12 may be manufactured from any material known in the art that is able to house and store wet and/or dry food components. For example, tray 12 may be manufactured from plastic, cardboard, fiberboard, paperboard, jute, styrofoam, metals, or combinations thereof. In an embodiment, tray 12 is manufactured using a plastic material.

Similarly, tray 12 may have any shape or size known in the art. For example, tray 12 may be substantially square, rectangular, pyramidal, cylindrical, conical and spherical shapes, or combinations thereof. In an embodiment, tray 12 is substantially rectangular in shape. The skilled artisan will appreciate that tray 12 is not limited to a specific size, so long as the trays are able to house the consumable products intended to be housed therein. In an embodiment, however, tray 12 may be designed for a child, or to help a child learn to self-feed. In this instance, for example, tray 12 may be appropriately sized for a child's small hands or have rounded corners to prevent injury to the child and to increase maneuverability of tray 12.

Figure 2:
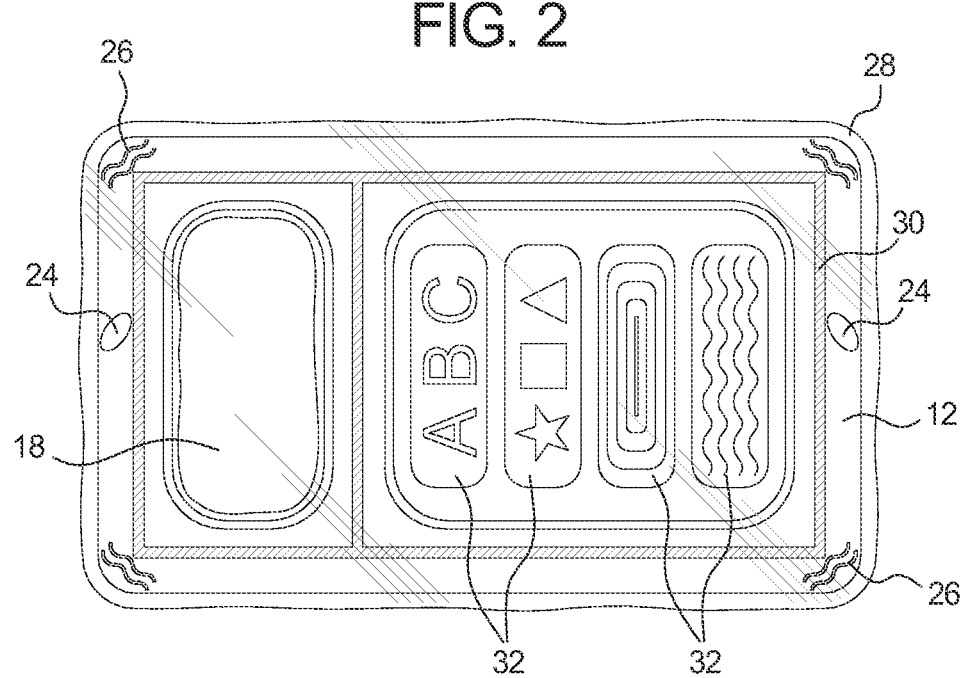
FIG. 2 illustrates a top view of a food product in accordance with an embodiment of the present disclosure.

In an embodiment, tray 12 may include a cover, lid, or shroud placed over top surface 22 of tray 12. The lid may be formed from the same material as tray 12, or a different material as tray 12, and may be adhered to, other otherwise fitted to tray 12 (e.g., friction-fit, snap-fit, etc.). Alternatively, tray 12 may simply include a shrink-wrap or plastic film 28 that encases tray 12, or is adhered to top surface 22 of tray 12, as is illustrated in FIG. 2. Plastic film 28 may be adhered to top surface 22 along a weld line 30, which may or may not separate first compartment 14 from second compartment 16. In an embodiment, weld line 30 separates first compartment 14 from second compartment 16 to prevent cross-contamination between wet food component 18 and dry food component 20.

As mentioned previously, in an embodiment, tray 12 includes a first compartment 14 and a second compartment 16. However, the skilled artisan will appreciate that tray 12 may include any number of compartments, which will be limited only by the size of tray 12. For example, in an embodiment, tray 12 includes a number of compartments selected from the group consisting of two, three, four, five, six, etc.

First and second compartments 14, 16 may be any size and shape known in the art for housing consumable products. Compartments 14, 16 may be the same shape, or different shapes, or the same size or different sizes. In an embodiment, first compartment 14 has a substantially oblong or elongated shape while second compartment 16 has a substantially rectangular shape. In this example, the substantially oblong shape of first compartment 14 can mirror the substantially oblong shape of dry food component 20 of second compartment 16. This correlation may aid in helping a child learn how to self-feed. In this regard, the child may learn to associate like shapes and by associating a shape of dry food component 20 with the shape of first compartment 14, the child may learn to dip dry food component 20 into wet food component 18 of first compartment 14.

Similarly, compartments 14, 16 may have any size known in the art for housing consumable products. In an embodiment, however, first compartment 14 and/or second compartment 16 may be sized so as to allow a food component to be at least partially inserted therein. For example, and as shown in FIG. 1, first compartment 14 is sized so as to allow dry food component 20 from second compartment 16 to be at least partially dipped into wet food component 18 in first compartment 14. Again, this correlation may aid in helping a child learn how to self-feed. In this regard, dry food component 20 may be easily and effortlessly inserted into first compartment to allow a child to dip dry food component 20 therein.

In an embodiment, first and second compartments 14, 16 may be sized to allow only specific sizes of consumable products to be housed therein. By limiting the size of first and second compartments 14, 16, a child's portion of food for consumption may be controlled, which can aid in reducing the risk of childhood obesity. For example, a portion size for either wet food component 18 or dry food component 20 may range from about 0.25 ounces to about 2 ounces, or from about 0.5 ounces to about 1.75 ounces, or from about 0.75 ounces to about 1.5 ounces, or from about 1.0 ounce to about 1.25 ounces. In an embodiment, wet food component 18 has a portion size ranging from about 0.75 ounces to about 1.25 ounces and dry food component 20 has a portion size ranging from about 0.5 ounces to about 1.5 ounces.

In addition to the size and shape of compartments 14, 16, tray 12 may also include other features that aid in helping a child learn how to self-feed. Although the present disclosure discusses such features with respect to a child, the skilled artisan will appreciate that other portions of the population may benefit from such features as well including, but not limited to, individuals with poor motor skills, diseases affecting motor control, physical handicaps, etc. Accordingly, the skilled artisan will appreciate that the present disclosure is not limited to uses of the present products for self-feeding of children.

As shown in FIG. 1, top portion 22 of tray 12 may include any number of surfaces features that help a child grip tray 12 for self-feeding. For example, tray 12 may include a thumb groove 24 on top surface 22 of tray 12 and/or corresponding finger grooves (not shown) on a bottom surface (not shown) of tray 12. These grooves 24 will help a child to grip tray 12 with one hand while self-feeding with the other. Thumb grooves 24 and/or finger grooves may be provided on either side of tray 12 to accommodate right- or left-handed consumers.

Further, top surface 22 of tray 12 may also include a surface characteristic such as, for example, textured ridges 26 that provide texture to help a child grip tray 12. Although described and illustrated as textured ridges 26, the skilled artisan will appreciate that any textured, raised or indented shape will provide a similar gripping function, and that the present disclosure should not be limited to textured ridges. For example, to appeal to a child consumer, tray 12 may include raised or indented shapes including, but not limited to, geometric shapes, letters, numbers, fruits, vegetables, animals, toys, boats, cars, trains, planes, etc. Alternatively, for an adult consumer, tray 12 may include raised or indented shapes including, but not limited to, branding information, fruits, vegetables, etc. Regardless of the shape, textured portions such as textured ridges 26 can help a consumer to grip tray 12 for feeding purposes.

Tray 12 may also include a geometry that allows a consumer to easily hold and maneuver tray 12 for self-feeding. For example, tray 12 may include rounded corners that are less likely to interfere with movement of tray 12 during manipulation during feeding, which allows for easy dipping of dry food component 20 in wet food component 18.

As shown in FIG. 2, and as mentioned previously, tray 12 may include a cover or lid to protect any consumable products packaged therein. The cover or lid may be any cover or lid known to protect food during shelf storage. For example, the cover or lid may be snap-fit, friction-fit, adhered, etc. to tray 12 and may be made of any suitable material including, plastic, cardboard, cardstock, film, etc. In an embodiment, cover or lid is a plastic film 28 that may be clear so as to provide visibility to any consumable products housed within tray 12. As is shown in FIG. 2, plastic film 28 may be adhered to tray 12 along a weld line 30 that separates first compartment 14 from second compartment 16 to prevent any cross-contamination between wet food component 18 and dry food component 20. This type of dual-seal will allow a consumer to open one compartment of tray 12 at a time. The skilled artisan will appreciate, however, that weld line 30 need not separate first and second compartments 14, 16 if the food products housed by tray 12 are similar, would not cause cross-contamination issues, etc.

Alternatively, instead of one piece of plastic film 28 used to cover both first and second compartments 14, 16, two separate pieces of plastic film 28 may be applied to tray 12; a first piece to cover first compartment 14, and a second piece to cover second compartment 16. Further, a first piece of plastic film 28 may be used to cover first compartment 14 and a second piece of plastic film 28 may be used to cover both first and second compartments 14, 16. Even still, a first piece of plastic film 28 may be used to cover second compartment 16 and a second piece of plastic film 28 may be used to cover both first and second compartments 14, 16.

Additionally, the skilled artisan will appreciate that tray 12 and/or plastic film 28 may have any number of advantageous characteristics to help prolong the shelf-life of the product. For example, the packaging (e.g., tray 12, plastic film 28, etc.) of the present products may include oxygen scavengers, an oxygen barrier, a moisture barrier, or the like. Providing such characteristics into the present packaging will help to improve the integrity of the packaging and to preserve the shelf-life of any food products contained therein.

Marketability of the present products may be enhanced by the presence of an indicia provided on an exterior and/or interior of the trays of the present disclosure. The indicia may include, for example, logos, advertisements, branding information, nutritional information, product information, manufacturer information, or the like, or combinations thereof. For example, tray 12 can include branding information at any exterior or interior surface thereon. The indicia may also be provided in a number of ways. For example, in an embodiment, the indicia may be printed on a pressure sensitive material (e.g., sticker), printed directly on the trays, molded into the trays, etc. In a different embodiment, the trays may be surrounded by a layer of material printed with indicia such as a shrink wrap material. The skilled artisan will appreciate that the types or methods of branding packages or secondary packages are not limited by those examples disclosed herein and that the indicia or method of applying same may include any types or methods of application known in the art.

Providing separate compartments 14, 16 of tray 12 will allow different types, sizes and amounts of products to be housed in tray 12. For example, first compartment 14 may include one or more of a first size of a product, while second compartment 16 includes one or more of a second size of a product, or even one or more of a different type of product. The consumable products may be a solid, liquid, semi-liquid, or combinations thereof. For example, the consumable products may be any consumable products including, for example, baby foods, snack foods, full meals, side meals, confectioneries, medicaments, gum, mints, etc. Tray 12 can hold different colors of the same or different consumable product. Differently flavored, coated or textured products can also be stored therein. In an embodiment, tray 12 houses foods for children (e.g., infants, toddlers, pre-schoolers, etc.) including, for example, baby foods, fruits, vegetables, grains, cereals, pastas, cookies, purees, yogurts, etc. The consumable products may be finger foods or may be designed to be consumed using utensils.

In an embodiment, first compartment 14 includes a wet food component 18 and second compartment 16 includes a dry food component 20. Wet food component 18 may be a liquid or semi-liquid food component, or any component that may be hot-filled such as, but not limited to, oatmeal, a puree, a yogurt product, a frosting, a sauce (e.g., a fruit sauce, a vegetable sauce such as tomato, hummus, beans, guacamole, an ethnic sauce such as curries, and salsa, etc.), a dip, fruit pieces, dairy, cheese, savory food products, etc. In an embodiment, wet food component 18 may be a fruit puree. In an embodiment wherein wet food component 18 is a yogurt product, the yogurt product may be a yogurt powder, a fresh yogurt, shelf-stable yogurt, freeze-dried yogurt, a yogurt-like substance, etc. Wet food component 18 may include a liquid whole grain. In an embodiment, wet food component 18 does not include any artificial preservatives (e.g., anti-bacterial, added ingredients intended to work as an artificial preservative etc.). In an embodiment, however, wet food component 18 includes only natural preservatives (e.g., mixed tocopherols, sodium, microgard or other fermentation byproducts, niacin, honey, raisins, vitamins, organic acids, etc.) such that wet food component 18 is an all natural product.

In an embodiment, food components of the present products 10 may include sodium as a natural preservative. The daily recommended amount is between 500 mg and 1000 mg, which is only about one-half to one and a half teaspoons of table salt a day. Too much sodium intake increases your chances of developing any number of health conditions including, but not limited to, high blood pressure, increased risk of heart disease, kidney disease, and stroke. Therefore, in order to provide a healthy, nutritious food product, sodium may be used in wet food component 18 in amounts that are less than about 200 mg/serving, or less than about 150 mg/serving, or less than about 100 mg/serving, or less than about 50 mg/serving, or less than about 25 mg/serving. In this regard, Applicant is able to provide a healthy, nutritious food product without the negative side effects associated with consumption of high levels of sodium.

Food components of the present products 10 may also include a variety of additional ingredients including, but not limited to, carbohydrates, proteins, fats, fibers, sugars, vitamins, minerals, prebiotics, probiotics, etc. For example, products 10 of the present disclosure may include a source of fiber, fiber or a blend of different types of fiber. The fiber blend may contain a mixture of soluble and insoluble fibers. Soluble fibers may include, for example, fructooligosaccharides, acacia gum, inulin, etc. Insoluble fibers may include, for example, pea outer fiber.

In an embodiment, products 10 further include a source of carbohydrates. Any suitable carbohydrate may be used in the present nutritional compositions including, but not limited to, sucrose, lactose, glucose, fructose, corn syrup solids, maltodextrin, modified starch, amylose starch, tapioca starch, corn starch, or combinations thereof. When the carbohydrates include sugar, it is important that the amounts of sugar be reduced to a healthy amount. For example, products 10 may include sugar in an amount of less than about 15 g, or less than about 14 g, or less than about 13 g, or less than about 12 g, or less than about 11 g, or less than about 10 g of sugar per every 50 g serving of product 10 including the combination of wet food component 18 and dry food component 20. Wet food component 18 may include less than about 8 g, or less than about 7 g, or less than about 6 g, or less than about 5 g, or less than about 4 g, or less than about 3 g of sugar per every 50 g serving of product 10 including the combination of wet food component 18 and dry food component 20. In an embodiment, wet food component 18 includes less than about 5 g sugar per serving. Dry food component 20 may include less than about 10 g, or less than about 9 g, or less than about 8 g, or less than about 7 g, or less than about 6 g, or less than about 5 g of sugar per every 50 g serving of product 10 including the combination of wet food component 18 and dry food component 20. In an embodiment, dry food component 20 includes less than about 7 g sugar per serving.

In an embodiment, food components of products 10 may further include a source of fat. The source of fat may include any suitable fat or fat mixture. For example, the fat may include, but is not limited to, vegetable fat (such as olive oil, corn oil, sunflower oil, rapeseed oil, hazelnut oil, soy oil, palm oil, coconut oil, canola oil, lecithins, and the like) and animal fats (such as milk fat). The fat content of wet food component 18 may be less than about 8 g, or less than about 7 g, or less than about 6 g, or less than about 5 g, or less than about 4 g, or less than about 3 g, or less than about 2 g per 50 g serving size of the product combination including wet food component 18 and dry food component 20. At these levels, products 10 may be administered to a consumer and contain healthy amounts of fats to reduce the risk of obesity and/or adverse health issues associated with the intake of too much fat.

In an embodiment, food components of products 10 may further include one or more synbiotics, phytonutrients and/or antioxidants. The antioxidants may be selected from the group consisting of carotenoids, coenzyme Q10 ("CoQ10"), flavonoids, glutathione, Goji (Wolfberry), hesperidin, Lactowolfberry, lignan, lutein, lycopene, polyphenols, selenium, tocopherols, vitamin A, vitamin B1, vitamin B6, vitamin B12, vitamin C, vitamin D, vitamin E, or combinations thereof.

In an embodiment, food components of products 10 may further include one or more vitamins and minerals. Non-limiting examples of vitamins include Vitamins A, B-complex (such as B-1, B-2, B-6 and B-12), C, D, E and K, niacin and acid vitamins such as pantothenic acid and folic acid, biotin, or combinations thereof. Non-limiting examples of minerals include calcium, iron, zinc, magnesium, iodine, copper, phosphorus, manganese, potassium, chromium, molybdenum, selenium, nickel, tin, silicon, vanadium, boron, or combinations thereof.

Additionally, a serving size or portion of wet food component 18 housed in tray 12 may provide an amount of fruit and/or vegetables so as to provide a consumer with a full daily serving of fruit and/or vegetables. The skilled artisan would immediately understand how much of a fruit or vegetable is required to provide a consumer with a full daily serving. For example, the U.S. Department of Agriculture sets the guidelines for recommended daily servings and amounts of certain foods. These recommendations are public knowledge and may be easily found in literature. In an embodiment, wet food component 18 may include 50% or greater by weight of fruit (e.g., purees, juices, concentrates, whole fruit, fruit pieces, etc.), or 60% or greater, or 70% or greater, or 80% or greater, or 90% or greater or about 100% fruit. The skilled artisan will appreciate that the same amounts of vegetables may also be included in wet food component 18.

Although described as "wet," food component 18 should have a controlled water activity and pH. The water activity of wet food component 18 may be considered a high water activity ranging between, for example, 0.60 and 1.00. In an embodiment, the water activity of wet food component 18 is greater than about 0.70, 0.75, 0.80, 0.85, 0.90, 0.95, 0.96, 0.97, 0.98, or 0.99. The pH of wet food component 18 may range from about 3.0 to about 5.0, or from about 3.5 to about 4.5, or about 4.0. In an embodiment, the pH of wet food component 18 is less than or equal to about 4.6. In another embodiment, the pH of wet food component 18 is less than about 4.3.

In order to provide age appropriate feeding, the viscosity of wet food component 18 should be thick enough to allow a child to scoop wet food component 18 with dry food component 20, or to allow wet food component 18 to cling to dry food component 20 so that a child can consume both wet food component 18 and dry food component 20. In this regard, wet food component 18 may have a viscosity at a temperature from about 60° F. to about 80° F. that ranges from about 5,000 to about 100,000 cps, or from about 10,000 to about 80,000 cps, or from about 20,000 to about 70,000 cps, or from about 30,000 to about 60,000 cps, or from about 40,000 to about 50,000 cps on a #6 spindle, 5 RPM Brookfield DV1+ viscometer.

Dry food component 20 may be a baked product, cookie, cracker, extruded and dried product, extruded and baked product, waffle, rusk, wafer, chip, coated or uncoated product, granola bar, biscuit, freeze dried product (e.g., a yogurt melt product in a dippable size), puffs, etc. In an embodiment, dry food component 20 is a biscuit or cookie. Dry food component 20 may include whole wheat, whole grain, liquid whole grains, multigrain, white flour, etc. For example, in an embodiment, dry food component 20 includes whole wheat, whole grain, multigrain, white flour, etc. in an amount ranging from about 1.0 to about 5.0 g per serving size of dry food component 20. Providing grains helps to provide structural stability to dry food component 20 to allow dry food component 20 to be dipped into wet food component 18 more than once and maintain its structural integrity but still dissolve in the mouth when consumed. In this regard, dry food component 20 may have a hardness value between about 300 and 700 N peak force, or between about 400 and 600 N peak force, or about 500 N peak force when using a texture analyzer. Such a hardness value allows dry food component 20 to be dissolvable when consumed, but to hold together for multiple dippings in wet food component 18 prior to consumption. In this regard, and similar to wet food component 18, dry food component 20 is designed for age appropriate feeding since a small child will be able to handle dry food component 20 for an extended period of time to allow the child the time necessary to coordinate its fine motor skills to dip dry food component 20 into wet food component 18 for self-feeding.

Additionally, as shown in FIGS. 1 and 2, dry food component 20 may include other design features that aid in teaching and allowing a child to self-feed. For example, dry food component 20 may be sized for handling by small hands to allow a small child to adequately grip dry food component 20 for feeding. Therefore, in an embodiment, dry food component 20 may be a substantially oblong shape as shown in FIGS. 1 and 2 (e.g., having straight edges and rounded ends) with a length ranging from about 2.0 inches to about 3.0 inches, or from about 2.2 inches to about 2.8 inches, or from about 2.4 inches to about 2.6 inches, or about 2.5 inches. Dry food component 20 may also have a width ranging from about 0.5 to about 1.5 inches, or from about 0.6 to about 1.4 inches, or from about 0.7 inches to about 1.3 inches, or from about 0.8 inches to about 1.2 inches, or from about 0.9 inches to about 1.1 inches, or about 1.0 inch. Dry food component 20 may further include a thickness ranging from about 0.1 inch to about 1.0 inch, or from about 0.2 inches to about 0.9 inches, or from about 0.3 inches to about 0.8 inches, or from about 0.4 inches to about 0.7 inches, or from about 0.5 inches to about 0.6 inches.

Dry food component 20 may also include raised or indented surface characteristics 32 (e.g., ridges or other surface texturing) that help a child to grip the food product for feeding. For example, and as shown in FIG. 2, dry food component 20 can include raised surface characteristics 32 such as letters, numbers, geometric shapes, ridges, concentric circles, etc. These surface characteristics 32 not only help a child to grip dry food component 20, but also aid in helping wet food component 18 cling to the surface of dry food component 20 for ease of consumption by a child. In an embodiment, surface characteristic 32 of dry food component 20 may include a bump or a plurality of bumps (not illustrated) on a bottom side of dry food component 20 to aid in stackability of the component. The bumps may be regularly or irregularly spaced on dry food component 20, and may be the same sizes, different sizes, the same shapes or different shapes. Dry food component 20 may also include an increased width of a neck area to provide durability and stability to the component.

Dry food component 20 maybe sized and shaped to be able to easily fit into first and second compartments 14, 16 for ease of storage and ease of dipping. In this regard, dry food component 20 (or a plurality of dry food components) may be sized and shaped to easily fit within and be stored within second compartment 16. At the same time, dry food component 20 may be sized and shaped to easily fit within first compartment 14 for dipping dry food component 20 into wet food component 18. To further aid in self-feeding, first compartment 14 may be shaped to have the same shape as dry food component 20 (e.g., substantially oblong with straight edges and rounded ends, as shown by FIGS. 1 and 2). This correlation may provide a visual cue of use to help a child better understand the interaction between dry food component 20 and wet food component 18 (i.e., dip dry food component 20 into wet food component 18).

In an embodiment, dry food component 20 does not include any artificial preservatives (e.g., anti-bacterial, added ingredients intended to work as a preservative, etc.). In an embodiment, however, dry food component 20 includes only natural preservatives (e.g., mixed tocopherols, sodium, microgard or other fermentation byproducts, niacin, honey, raisins, vitamins, organic acids, etc.) such that dry food component 20 is an all natural product.

In an embodiment, food components of the present products 10 may include sodium as a natural preservative. The daily recommended amount is between 500 mg and 1000 mg, which is only about one-half to one and a half teaspoons of table salt a day. Too much sodium intake increases your chances of developing any number of health conditions including, but not limited to, high blood pressure, increased risk of heart disease, kidney disease, and stroke. Therefore, in order to provide a healthy, nutritious food product, sodium may be used in dry food component 20 in amounts that are less than about 200 mg/serving, or less than about 150 mg/serving, or less than about 100 mg/serving, or less than about 50 mg/serving, or less than about 25 mg/serving. In this regard, Applicant is able to provide a healthy, nutritious food product without the negative side effects associated with consumption of high levels of sodium.

Alternatively, dry food component 20 may include antioxidants as a natural preservative. Such antioxidants may include polyphenols, tocopherols, Vitamins A, C and E, etc. In an embodiment, dry food component 20 includes mixed tocopherols to help extend the shelf-life. Although dry food component 20 may include mixed tocopherols as preservatives, dry food component 20 does not include any artificial preservatives such as, for example, anti-bacterial preservatives.

Dry food component 20 should have a controlled water activity and pH. The water activity of dry food component 20 may be less than or equal to 0.70, or may range from about 0.05 to about 0.70 . In an embodiment, the water activity of dry food component 20 is between about 0.10 and about 0.70, or 0.15 and 0.70, or 0.20 and 0.70, or 0.30 and 0.70, or 0.40 and 0.70, or 0.50 and 0.70, or about 0.60 . In an embodiment, the water activity of dry food component 20 is about 0.30, 0.35, or 0.40.

As discussed previously, shelf-stable products 10 of the present disclosure provide several advantages over known products including, but not limited to, a shelf-stable, single package having a wet and a dry food component without the use of artificial preservatives, and numerous self-feeding characteristics. As discussed previously, tray 12 may be designed to aid a child in self-feeding. Similarly, wet food component 18 and dry food component 20 may be selected to aid a child in self-feeding and, as such, may be designed for children of a particular age (e.g., below about 8 years of age, or below 7 years, 6 years, 5 years, 4 years, 3 years, 2 years, 1.5 years, etc.). In an embodiment, products 10 of the present disclosure are designed for a child between the ages of 18 and 36 months. In this regard, dry food component 20 may be a solid food product (e.g., a biscuit, cookie, cracker, puff, etc.) that is designed to be dipped into wet food component 18 (e.g., frosting, puree, yogurt, etc.). The interaction between dry food component 20 and wet food component 18 helps a child to fine tune motor skills and aids in developing hand/eye coordination, both of which promote age appropriate feeding. The skilled artisan will appreciate, however, that products 10 of the present disclosure are not limited to use by children, and may be used by individuals having developmental disorders, physical disabilities or limitations, mental disabilities or limitations, or any individual requiring a food product that is ease to self-feed.

In an embodiment, methods for making products of the present disclosure are also provided. The methods include the use of a manufacturing system that produces a single, shelf-stable, dual-compartment package having a wet food component and dry food component without the use of artificial preservatives. The manufacturing systems are continuous, integrated manufacturing systems that incorporate two, unique hygiene zones and processing technologies. In an embodiment, a first zone is a bakery/ambient temperature zone and a second zone is a hot-fill-hold zone. Regardless of the zone specifics, however, the manufacturing systems are a single, continuous line with a barrier between the zones to prevent cross-contamination.

Figure 3:
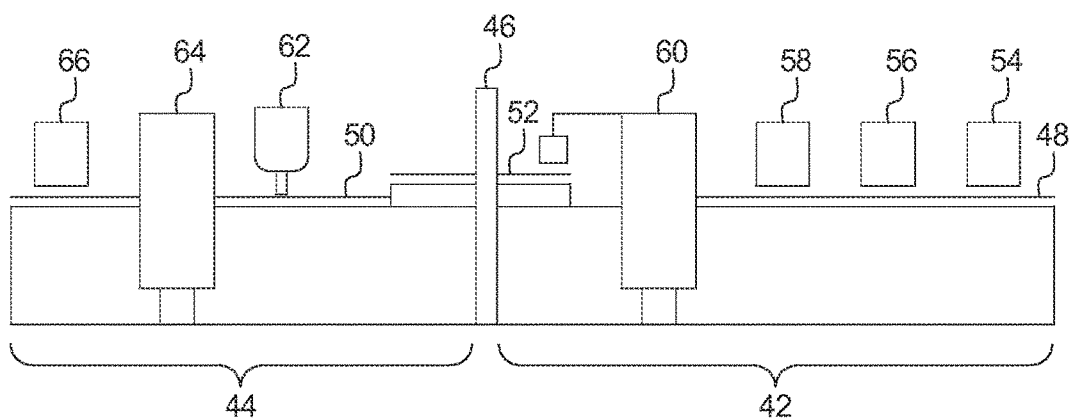
FIG. 3 illustrates a side schematic view of a manufacturing line in accordance with an embodiment of the present disclosure.

Referring now to FIG. 3, a schematic manufacturing line 40 includes a dry zone 42 and a wet zone 44 separated by a barrier 46. Each zone 42, 44 may include its own conveyor 48, 50 and each conveyor 48, 50 may be in communication with a transfer conveyor 52 that transports a food product from first conveyor 48 to second conveyor 50. Transfer conveyor 52 ensures that first (e.g., dry) conveyor 48 does not contact second (e.g., wet) conveyor 50. Similarly, neither first nor second conveyors 48, 50 contact transfer conveyor 52.

Dry zone 42 may be a dry zone that is used to package dry food component 20 into tray 12. In dry zone 42, dry food component 20 may be packaged into tray 12 by a tray filling system 54, after which tray 12 is transferred to a sealing system 56 where the compartment in which dry food component 20 is packaged (e.g., second compartment 16) is sealed. The skilled artisan will appreciate, however, that dry food component 20 (and/or wet food component 18) may be packaged into tray 12 manually by human workers instead of using a machine/automated filling system. Similarly, all steps involved in the present manufacturing systems and methods may be performed by human workers instead of machines and/or apparatuses.

Tray 12 then moves to an evacuation system 58 to remove any loose dry food component 20 crumbs from other compartments in tray 12 (e.g., first compartment 14). Evacuation system 58 may include an evacuation means that provides evacuation via, for example, high pressure air blowing, vacuum, vibration, tilting, a die having the shape of, for example, first compartment 14 and having an adhesive therein to remove dry food component 20 crumbs, etc. After any dry food component 20 crumbs are removed from unsealed compartments, tray 12 may be lifted on panels and transferred to transfer conveyor 52 by an overhead transfer system 60. Transfer conveyor 52 transfers tray 12 through a barrier 46 to second conveyor 50 in wet zone 44.

Barrier 46 may be any known barrier used to separate two hygienic zones. For example, barrier 46 may be a physical barrier such as a wall, shield, guard, cover, tarp, panel etc. that physically separates first and second zones 42, 44. In another embodiment, barrier 46 is a high pressure air barrier that has the highest air pressure at the location of barrier 46, and an air pressure gradient that lowers in air pressure as the location moves away from barrier 46 until a lower (e.g., atmospheric) pressure is achieved. The physical separation provided by barrier 46 prevents, for example, workers or products from one side contaminating the work space of the other zone. In this regard, workers are separated and cannot work in both zones, humidities in the two separate zones can be separately controlled, and product transfer between zones is limited.

After tray 12 passes through barrier 46, it is lowered onto second conveyor 50 where a wet filling apparatus 62 fills an open compartment with wet food component 18. In an embodiment, wet food component 18 is hot-filled. Alternatively, wet food component 18 may also be cold-filled. After wet food component 18 is filled, tray 12 goes to a pasteurization apparatus 64 that is close to wet filling apparatus 62. Wet food component 18 may be filled in close proximity to pasteurization apparatus 64 to maintain the heat of the hot-filled wet food component 18. In an embodiment, pasteurization apparatus 64 is a dry pasteurization tunnel. The use of a dry pasteurization tunnel is advantageous because the low wet volume of wet food component 18 will not hold enough heat to provide commercial sterility. However, the skilled artisan will appreciate that, depending on the product volume of wet food component 18, sufficient heat may be provided so as to not require the use of a heat tunnel for commercial sterility. After pasteurization apparatus 64, tray 12 moves into a second sealing apparatus 66 where the compartment housing wet food component 18 (e.g., first compartment 14) is sealed.

Packaging dry food component 20 first provides the benefit that dry food component 20 crumbs may be more efficiently and completely removed from remaining tray compartments prior to the introduction of wet food component 18 into the compartments. This is important because any cross-contamination in compartments of tray 12 can drastically reduce the shelf-like of products 10 and even promote spoilage and bacterial growth.

Figure 4:
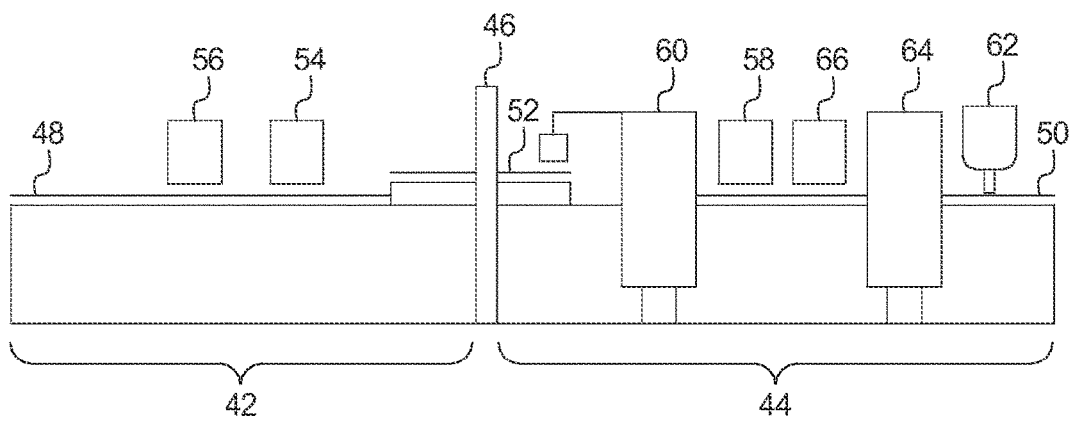
FIG. 4 illustrates a side schematic view of a manufacturing line in accordance with an embodiment of the present disclosure.

The skilled artisan will appreciate, however, that the manufacturing process described above need not begin with filling of dry food component 20, and may be reversed such that wet food component 18 is filled first. For example, and referring now to FIG. 4, wet zone 44 now becomes the first zone and dry zone 42 now becomes the second zone. As shown by FIG. 4, tray 12 may be transferred on wet conveyor 50 to wet filling apparatus 62 prior to entering near-by pasteurization apparatus 64. After pasteurization, tray 12 may pass through sealing apparatus 66 before moving into evacuation apparatus 58 to remove any remaining portions of wet food component 20 in unsealed tray compartments. Tray 12 may then be lifted on panels (not shown) and transferred from wet conveyor 50 to transfer conveyor 52 by overhead conveyor apparatus 60. Once tray 12 passes through barrier 46, tray 12 is transferred to dry conveyor 48 before an open compartment in tray 12 is filled with dry food component 20 and then the dry food component 20 is sealed in tray 12 by sealing apparatus 56.

Packaging wet food component 18 first provides the benefits of reduction of thermal impact on dry food component 20 and added hygiene control in wet zone 44. This is important because any cross-contamination in compartments of tray 12 can drastically reduce the shelf-like of products 10 and even promote spoilage and bacterial growth. Additionally, it is important that dry food component 20 maintain the structural integrity necessary to be dipped several times but still dissolve in the mouth when consumed.

The skilled artisan will appreciate that other manufacturing apparatuses may be added to manufacturing line 40 to make products 10 of the present disclosure. For example, tray 12 may be formed via a cup-forming, or stamping, apparatus (not shown) prior to the filling of any compartment with any food product. Additionally, after compartments of tray 12 have been filled and sealed, a secondary packaging apparatus (not shown) may be used to provide an outer packaging over tray 12. Similarly, other known manufacturing apparatuses may be used to manufacture products 10 of the present disclosure.

Providing a manufacturing process using manufacturing lines 40 of the present disclosure provides the advantages of having one, integrated manufacturing system that incorporates two hygienic zones and processing technologies to make a shelf-stable product including a wet food component and a dry food component without artificial preservatives. In this regard, it is not necessary, as is the case with many currently manufacturing processes, to fill a first food component at a location that is remote from a second location where a wet food component may be filled. Similarly, it is not necessary for either a wet food component or a dry food component to be prepackaged prior to manufacturing lines 40. Indeed, in an embodiment, neither a wet food component nor a dry food component is prepackaged.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A multi-component food product, consisting of:
   a single unitary tray of one piece construction comprising a top surface and at least a first compartment and a second compartment separate from each other;
   a wet, flowable food component positioned within and in direct contact with the first compartment in a way that the wet, flowable food component wets the unitary tray of one piece construction;
   a dry, solid food component positioned within and in direct contact with the second compartment; and
   a single lid secured to the top surface of the tray to seal the first compartment and the second compartment in a way to prevent cross-contamination between the wet food component and the dry food component,
   wherein each of the wet food component and the dry food component is free of any artificial preservatives.

2. The product of claim 1, wherein a food component selected from the group consisting of the wet food component, the dry food component, and combinations thereof, does not contain any preservatives.

3. The product of claim 1, wherein a food component selected from the group consisting of the wet food component, the dry food component, and combinations thereof, contains only natural preservatives.

4. The product of claim 1, wherein the wet food component comprises a property selected from the group consisting of a pH that is less than about 4.6, a water activity ranging from greater than or equal to about 0.70 to less than 1.0, and combinations thereof.

5. The product of claim 1, wherein the wet food component is a food product selected from the group consisting of a fruit sauce, oatmeal, fruit pieces, a yogurt product, a dairy product, a cheese product, a savory product, a vegetable sauce, an ethnic sauce, and combinations thereof.

6. The product of claim 1, wherein the wet food component comprises at least about 50% by weight of a fruit product.

7. The product of claim 1, wherein the wet food component comprises an age appropriate viscosity.

8. The product of claim 1, wherein the food product comprises an ingredient selected from the group consisting of a sodium content that is less than about 100 mg per serving size of the product including a combination of the wet food component and the dry food component, a sugar content that is less than about 12 g per serving size of the product including a combination of the wet food component and the dry food component, and combinations thereof.

9. The product of claim 1, wherein the dry food component is a food product selected from the group consisting of a cookie, a cracker, an extruded and dried product, an extruded and baked product, a waffle, a rusk, a wafer, a chip, a coated product, an uncoated product, a granola bar, a biscuit, a freeze-dried product, a puff, and combinations thereof.

10. The product of claim 1, wherein the dry food component has a hardness value sufficient to allow (i) the dry food component to be dipped at least once into wet food component and maintain structural stability, and (ii) the dry food component to dissolve in a consumer's mouth when consumed.

11. The product of claim 1, wherein the product is a packaged food product.

12. The product of claim 1, wherein the tray comprises a property selected from the group consisting of a shape to promote age appropriate feeding; a size to promote age appropriate feeding; a size to be gripped by small hands; a surface characteristic selected from the group consisting of a thumb groove, a raised surface pattern, and indented surface pattern, and combinations thereof; a shape selected from the group consisting of round, square, rectangular, triangular, oval, hemi-spherical, and combinations thereof; and combinations thereof.

13. The product of claim 1, wherein a top surface of the tray comprises a property selected from the group consisting of a surface characteristic selected from the group consisting of a thumb groove, a raised surface pattern, and indented surface pattern, and combinations thereof; a shape selected from the group consisting of round, square, rectangular, triangular, oval, hemi-spherical, and combinations thereof; and combinations thereof.

14. The product of claim 1, wherein the at least first and second compartments have the same shape.

15. The product of claim 1, wherein the at least first and second compartments have different shapes.

16. The product of claim 1, wherein the lid comprises a property selected from the group consisting of a surface characteristic selected from the group consisting of a thumb groove, a raised surface pattern, and indented surface pattern, and combinations thereof; a shape selected from the group consisting of round, square, rectangular, triangular, oval, hemi-spherical, and combinations thereof; and combinations thereof.

17. The product of claim 1, wherein neither the wet food product nor the dry food product is pre-packaged.

* * * * *